United States Patent
Chow (12)

(10) Patent No.: US 8,514,687 B2
(45) Date of Patent: Aug. 20, 2013

(54) EFFICIENT GENERATION OF COMPENSATED SIGNALS FOR CROSSTALK CONTROL IN A COMMUNICATION SYSTEM

(75) Inventor: Hungkei Chow, Livingston, NJ (US)

(73) Assignee: Alcatel Lucent, Paris (FR)

( * ) Notice: Subject to any disclaimer, the term of this patent is extended or adjusted under 35 U.S.C. 154(b) by 372 days.

(21) Appl. No.: 12/915,829

(22) Filed: Oct. 29, 2010

(65) Prior Publication Data

US 2012/0106315 A1    May 3, 2012

(51) Int. Cl.
*H04J 1/10* (2006.01)
*H04J 3/12* (2006.01)

(52) U.S. Cl.
USPC .......................................... 370/201; 370/236

(58) Field of Classification Search
USPC ................. 370/229, 230, 236, 237, 241, 249, 370/252, 201
See application file for complete search history.

(56) References Cited

U.S. PATENT DOCUMENTS

| | | | |
|---|---|---|---|
| 8,243,578 B2 * | 8/2012 | Kramer et al. ............... | 370/201 |
| 2006/0029148 A1 | 2/2006 | Tsatsanis | |
| 2009/0116582 A1 | 5/2009 | Ashikhmin et al. | |
| 2009/0175156 A1 * | 7/2009 | Xu ............................... | 370/201 |
| 2009/0245081 A1 | 10/2009 | Ashikhmin et al. | |
| 2010/0177855 A1 | 7/2010 | Ashikhmin et al. | |
| 2010/0202554 A1 * | 8/2010 | Kramer et al. ............... | 375/285 |
| 2010/0232486 A1 * | 9/2010 | Starr et al. ................... | 375/222 |

FOREIGN PATENT DOCUMENTS

EP    1936825 A1    6/2008

OTHER PUBLICATIONS

"Data Compression" www.wikipedia.org, Oct. 22, 2001, accessed Jan. 2, 2013.*
ITU-T Recommendation G.993.2, "Very High Speed Digital Subscriber Line Transceivers 2," Series G: Transmission Systems and Media, Digital Systems and Networks, Feb. 2008, 252 pages.
ITU-T Recommendation G.993.5, "Self-Text Cancellation (Vectoring) for Use with VDSL2 Transceivers," Series G: Transmission Systems and Media, Digital Systems and Networks, Apr. 2010, 80 pages.
U.S. Appl. No. 12/493,328, filed Jun. 29, 2009 and entitled "Crosstalk Estimation and Power Setting Based on Interpolation in a Multi-Channel Communication System."

* cited by examiner

*Primary Examiner* — Kerri Rose
(74) *Attorney, Agent, or Firm* — Ryan, Mason & Lewis, LLP (57) ABSTRACT

An access node of a communication system is configured to control crosstalk between channels of the system. Vectoring circuitry in the access node estimates crosstalk between channels of the system, generates a compressed representation of the crosstalk estimates, and generates compensated signals based on the compressed representation of the crosstalk estimates. The compressed representation comprises a value array and an index array, with the value array comprising selected values from each of a plurality of rows of a matrix representation of the crosstalk estimates, and the index array identifying locations of the selected values in the matrix representation of the crosstalk estimates. The compensated signals may be pre-compensated signals or post-compensated signals.

21 Claims, 5 Drawing Sheets

EFFICIENT GENERATION OF COMPENSATED SIGNALS FOR CROSSTALK CONTROL IN A COMMUNICATION SYSTEM

FIELD OF THE INVENTION

The present invention relates generally to communication systems, and more particularly to techniques for mitigating, suppressing or otherwise controlling interference between communication channels in such systems.

BACKGROUND OF THE INVENTION

Multi-channel communication systems are often susceptible to interference between the various channels, also referred to as crosstalk or inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, signals transmitted over one subscriber line may be coupled into other subscriber lines, leading to interference that can degrade the throughput performance of the system. More generally, a given "victim" channel may experience crosstalk from multiple "disturber" channels, again leading to undesirable interference.

Different techniques have been developed to mitigate, suppress or otherwise control crosstalk and to maximize effective throughput, reach and line stability. These techniques are gradually evolving from static or dynamic spectrum management techniques to multi-channel signal coordination.

By way of example, pre-compensation techniques allow active cancellation of inter-channel crosstalk through the use of a precoder. In DSL systems, the use of a precoder is contemplated to achieve crosstalk cancellation for downstream communications between a central office (CO) or another type of access node (AN) and customer premises equipment (CPE) units or other types of network terminals (NTs). It is also possible to implement crosstalk control for upstream communications from the NTs to the AN, using so-called post-compensation techniques implemented by a postcoder. Such pre-compensation and post-compensation techniques are also referred to as "vectoring," and include G.vector technology, which was recently standardized in ITU-T Recommendation G.993.5.

One known approach to estimating crosstalk coefficients for downstream or upstream crosstalk cancellation in a DSL system involves transmitting distinct pilot signals over respective subscriber lines between an AN and respective NTs of the system. Error feedback from the NTs based on the transmitted pilot signals is then used to estimate crosstalk. Other known approaches involve perturbation of precoder coefficients and feedback of signal-to-noise ratio (SNR) or other interference information.

Multiple subscriber lines that are subject to pre-compensation or post-compensation for crosstalk cancellation in a DSL system may be referred to as a vectoring group. In conventional DSL systems, the number of lines in a vectoring group is subject to practical limitations based on the processor and memory resources required to perform pre-compensation or post-compensation operations. Such operations include the computation of matrix-vector products using precoder and postcoder matrices, respectively. If there are N lines in the vectoring group, the precoder or postcoder matrices are typically of dimension N×N. For example, a given matrix-vector product computed in the precoder may be given by $y=Cx$, where y is an N×1 vector of pre-compensated signals, x is a corresponding N×1 vector of signals prior to pre-compensation, and C is the N×N precoder matrix. The complexity of the matrix-vector product operation therefore increases with N or, in other words, with the size of the vectoring group. For large values of N, the operation consumes large amounts of processing and memory resources, and also requires a substantial amount of time to complete. As a result, crosstalk cancellation with a large vectoring group can be impractical using conventional techniques.

SUMMARY OF THE INVENTION

Illustrative embodiments of the invention provide improved techniques for generating pre-compensated or post-compensated signals for controlling crosstalk between channels of a communication system. For example, in one or more of these embodiments, a precoder or postcoder implemented at least in part by a vector processor is configured to perform operations such as matrix-vector products using reduced amounts of processor and memory resources, thereby allowing crosstalk control to be performed for a larger vectoring group than would otherwise be possible.

In one aspect of the invention, an access node of a communication system is configured to control crosstalk between channels of the system. The access node may comprise, for example, a DSL access multiplexer of a DSL system. Vectoring circuitry in the access node estimates crosstalk between channels of the system, generates a compressed representation of the crosstalk estimates, and generates compensated signals based on the compressed representation of the crosstalk estimates. The compressed representation comprises a value array and an index array, with the value array comprising selected values from each of a plurality of rows of a matrix representation of the crosstalk estimates, and the index array identifying locations of the selected values in the matrix representation of the crosstalk estimates. The compensated signals may be pre-compensated signals or post-compensated signals.

In an illustrative embodiment, the vectoring circuitry comprises a vector processor configured to generate compensated signals for a vectoring group that comprises at least N=192 channels. The vector processor comprises a plurality of computation slices arranged in parallel with one another, with one slice for each of the plurality of channels. Each of the computation slices comprises first memory circuitry for storing entries of the index array, second memory circuitry for storing entries of the value array, third memory circuitry for storing entries of an uncompensated input signal vector and having a selection input coupled to an output of the first memory circuitry, a complex multiply-accumulate unit having inputs coupled to outputs of the first and third memory circuitry, and an output register having an input coupled to an output of the complex multiply-accumulate unit. The computation slices each generate entries of a compensated output signal vector.

Advantageously, the illustrative embodiments provide a substantial reduction in the processor and memory resources required for performing pre-compensation and post-compensation operations in vectored DSL systems, thereby permitting the use of much larger groups of vectored lines than would otherwise be possible. Also, the required computation time per tone is significantly reduced. DSL systems implementing the disclosed techniques exhibit reduced cost, lower power consumption, and enhanced throughput performance relative to conventional arrangements.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for crosstalk control in such systems. The crosstalk control may be applied substantially continuously, or in conjunction with activating of subscriber lines or other communication channels in such systems, tracking changes in crosstalk over time, or in other line management applications. It should be understood, however, that the invention is not limited to use with the particular types of communication systems and crosstalk control applications disclosed. The invention can be implemented in a wide variety of other communication systems, and in numerous alternative crosstalk control applications. For example, although illustrated in the context of DSL systems based on DMT modulation, the disclosed techniques can be adapted in a straightforward manner to a variety of other types of wired or wireless communication systems, including cellular systems, multiple-input multiple-output (MIMO) systems, Wi-Fi or WiMax systems, etc. The techniques are thus applicable to other types of orthogonal frequency division multiplexing (OFDM) systems outside of the DSL context, as well as to systems utilizing higher order modulation in the time domain.

Figure 1:
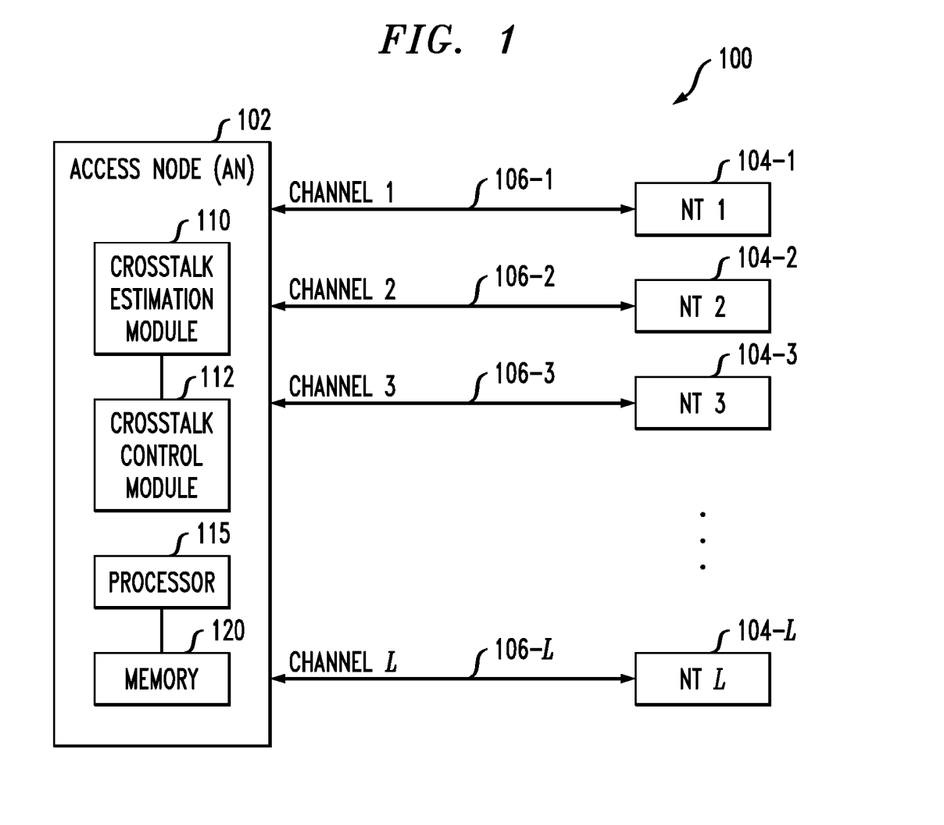
FIG. 1 is a block diagram of a multi-channel communication system in an illustrative embodiment of the invention.

FIG. 1 shows a communication system 100 comprising an access node (AN) 102 and network terminals (NTs) 104. The NTs 104 more particularly comprise L distinct NT elements that are individually denoted NT 1, NT 2, . . . NT L, and are further identified by respective reference numerals 104-1, 104-2, . . . 104-L as shown. A given NT element may comprise, by way of example, a modem, a computer, or other type of communication device, or combinations of such devices. The access node 102 communicates with these NT elements via respective channels 106-1, 106-2, . . . 106-L, also denoted Channel 1, Channel 2, . . . Channel L.

As indicated previously herein, in an embodiment in which system 100 is implemented as a DSL system, the AN 102 may comprise, for example, a central office (CO), and the NTs 104 may comprise, for example, respective instances of customer premises equipment (CPE) units. The channels 106 in such a DSL system comprise respective subscriber lines. Each such subscriber line may comprise, for example, a twisted-pair copper wire connection. The lines may be in the same binder or in adjacent binders, such that crosstalk can arise between the lines. Portions of the description below will assume that the system 100 is a DSL system, but it should be understood that this is by way of example only.

In an illustrative DSL embodiment, fewer than all of the L lines 106-1 through 106-L may be initially active lines, and at least one of the L lines may be a "joining line" that is to be activated and joined to an existing set of active lines. Such a joining line is also referred to herein as an "activating line." As indicated previously, a given set of lines subject to crosstalk control may be referred to herein as a vectoring group.

Communications between the AN 102 and the NTs 104 include both downstream and upstream communications for each of the active lines. The downstream direction refers to the direction from AN to NT, and the upstream direction is the direction from NT to AN. Although not explicitly shown in FIG. 1, it is assumed without limitation that there is associated with each of the subscriber lines of system 100 an AN transmitter and an NT receiver for use in communicating in the downstream direction, and an NT transmitter and an AN receiver for use in communicating in the upstream direction. A given module combining an AN transmitter and an AN receiver, or an NT transmitter and an NT receiver, is generally referred to herein as a transceiver. The corresponding transceiver circuitry can be implemented in the AN and NTs using well-known conventional techniques, and such techniques will not be described in detail herein.

The AN 102 in the present embodiment comprises a crosstalk estimation module 110 coupled to a crosstalk control module 112. The AN utilizes the crosstalk estimation module to obtain crosstalk estimates for respective ones of at least a subset of the lines 106. The crosstalk control module 112 is used to mitigate, suppress or otherwise control crosstalk between at least a subset of the lines 106 based on the crosstalk estimates. For example, the crosstalk control module may be utilized to provide pre-compensation of downstream signals transmitted from the AN to the NTs, and additionally or alternatively post-compensation of upstream signals transmitted from the NTs to the AN. A more detailed example of a pre-compensation technique implemented in an illustrative embodiment of the invention will be described below in conjunction with FIGS. 4 and 5.

The crosstalk estimation module 110 may be configured to generate crosstalk estimates from error samples, SNR values or other types of measurements generated in the AN 102 based on signals received from the NTs 104, or measurements generated in the NTs 104 and fed back to the AN 102 from the NTs 104. It should be noted that the term SNR as used herein is intended to be broadly construed so as to encompass other similar measures, such as signal-to-interference-plus-noise ratios (SINRs).

In other embodiments, crosstalk estimates may be generated outside of the AN 102 and supplied to the AN for further processing. For example, such estimates may be generated in the NTs 104 and returned to the AN for use in pre-compensation, post-compensation, or other crosstalk control applications. The crosstalk estimates may also be referred to as crosstalk channel coefficients, crosstalk cancellation coefficients, or simply crosstalk coefficients.

The crosstalk estimation module 110 may incorporate interpolation functionality for generating interpolated crosstalk estimates. Examples of interpolation techniques that may be utilized with the present invention are disclosed in U.S. Patent Application Publication No. 2009/0116582, entitled "Interpolation Method and Apparatus for Increasing Efficiency of Crosstalk Estimation," which is commonly assigned herewith and incorporated by reference herein.

The AN 102 may also or alternatively be configured to implement a technique for channel estimation using linearmodel interpolation. In implementing such a technique, the AN transmits the pilot signals over respective ones of the lines 106. Corresponding measurements such as error samples or SNR values are fed back from the NTs to the AN and utilized to generate crosstalk estimates in crosstalk estimation module 110. The AN then performs pre-compensation, post-compensation or otherwise controls crosstalk based on the crosstalk estimates. Additional details regarding these and other similar arrangements are described in U.S. patent application Ser. No. 12/493,328, filed Jun. 29, 2009 and entitled "Crosstalk Estimation and Power Setting Based on Interpolation in a Multi-Channel Communication System," which is commonly assigned herewith and incorporated by reference herein.

The crosstalk estimation module 110 may incorporate denoising functionality for generating denoised crosstalk estimates. Examples of crosstalk estimate denoising techniques suitable for use with embodiments of the invention are described in U.S. Patent Application Publication No. 2010/0177855, entitled "Power Control Using Denoised Crosstalk Estimates in a Multi-Channel Communication System," which is commonly assigned herewith and incorporated by reference herein. It is to be appreciated, however, that the present invention does not require the use of any particular denoising techniques. Illustrative embodiments to be described herein may incorporate denoising functionality using frequency filters as part of a channel coefficient estimation process.

The AN 102 further comprises a processor 115 coupled to a memory 120. The memory may be used to store one or more software programs that are executed by the processor to implement the functionality described herein. For example, functionality associated with crosstalk estimation module 110 and crosstalk control module 112 may be implemented at least in part in the form of such software programs. The memory is an example of what is more generally referred to herein as a computer-readable storage medium that stores executable program code. Other examples of computer-readable storage media may include disks or other types of magnetic or optical media.

It is to be appreciated that the AN 102 as shown in FIG. 1 is just one illustration of an "access node" as that term is used herein. Such an access node may comprise, for example, a DSL access multiplexer (DSLAM). However, the term "access node" as used herein is intended to be broadly construed so as to encompass, for example, a particular element within a CO, such as a DSLAM, or the CO itself, as well as other types of access point elements in systems that do not include a CO.

In the illustrative embodiment of FIG. 1 the lines 106 are all associated with the same AN 102. However, in other embodiments, these lines may be distributed across multiple access nodes. Different ones of such multiple access nodes may be from different vendors. For example, it is well known that in conventional systems, several access nodes of distinct vendors can be connected to the same bundle of DSL lines. Under these and other conditions, the various access nodes may have to interact with one another in order to achieve optimal interference cancellation.

Each of the NTs 104 may be configurable into multiple modes of operation responsive to control signals supplied by the AN 102 over control signal paths, as described in U.S. Patent Application Publication No. 2009/0245081, entitled "Fast Seamless Joining of Channels in a Multi-Channel Communication System," which is commonly assigned herewith and incorporated by reference herein. Such modes of operation may include, for example, a joining mode and a tracking mode. However, this type of multiple mode operation is not a requirement of the present invention.

An exemplary DSL implementation of the system 100 of FIG. 1 that is configured to perform at least one of pre-compensation and post-compensation will be described below with reference to FIGS. 2 through 5. More specifically, this implementation includes a precoder providing active crosstalk cancellation for downstream communications from AN 102 to the NTs 104, and also includes a postcoder providing active crosstalk cancellation for upstream communications from the NTs 104 to the AN 102. However, the techniques disclosed herein are applicable to systems involving symmetric communications in which there is no particular defined downstream or upstream direction.

Figure 2:
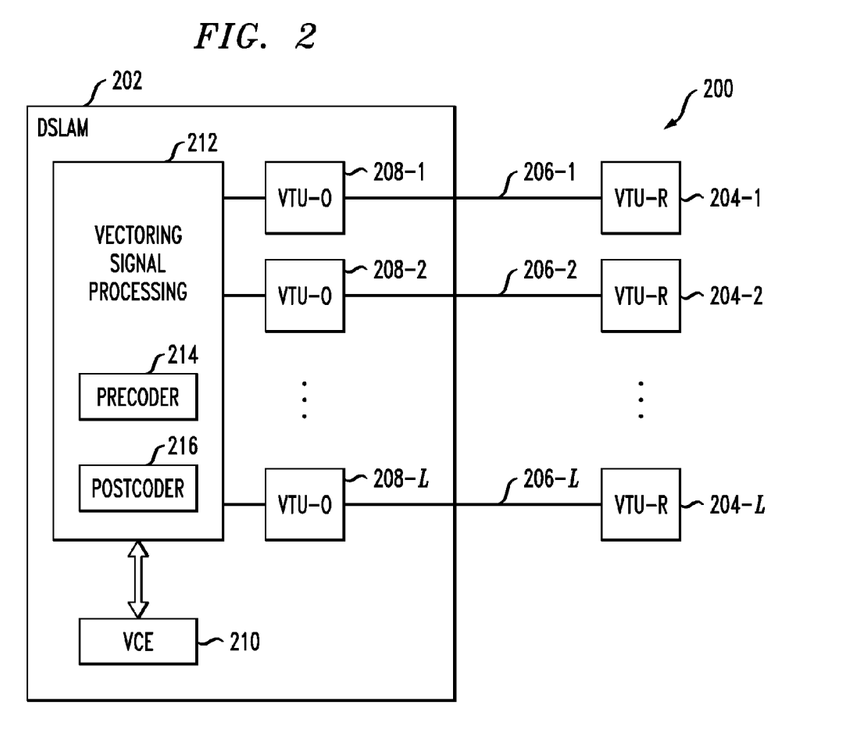
FIG. 2 shows an exemplary DSL implementation of the FIG. 1 communication system in an illustrative embodiment.

Referring now to FIG. 2, vectored DSL system 200 represents a possible implementation of the multi-channel communication system 100 previously described. A DSLAM 202 in an operator access node connects to a plurality of CPE units 204 via respective copper twisted pair lines 206 that may be in a common binder. The CPE units 204 more specifically comprise remote VDSL transceiver units (VTU-Rs) 204-1, 204-2, . . . 204-L. These VTU-Rs communicate with respective operator-side VDSL transceiver units (VTU-Os) 208-1, 208-2, . . . 208-L. The DSLAM 202 further comprises a vector control entity (VCE) 210 and a vectoring signal processing module 212. The vectoring signal processing module 212 comprises a precoder 214 and a postcoder 216. The VCE 210 and vectoring signal processing module 212 may be viewed as corresponding generally to crosstalk estimation module 110 and crosstalk control module 112 of system 100. Such elements are considered examples of what is more generally referred to herein as "vectoring circuitry."

In the FIG. 2 embodiment, it is assumed without limitation that the VTU-Rs 204 and corresponding VTU-Os 208 operate in a manner compliant with a particular vectoring standard, and more specifically the G.vector standard disclosed in ITU-T Recommendation G.993.5, "Self-FEXT cancellation (vectoring) for use with VDSL2 transceivers," April 2010, which is incorporated by reference herein. It should be noted that use of this particular standard is by way of illustrative example only, and the techniques of the invention can be adapted in a straightforward manner to other types and arrangements of vectoring-compliant AN and NT elements.

Figure 3:
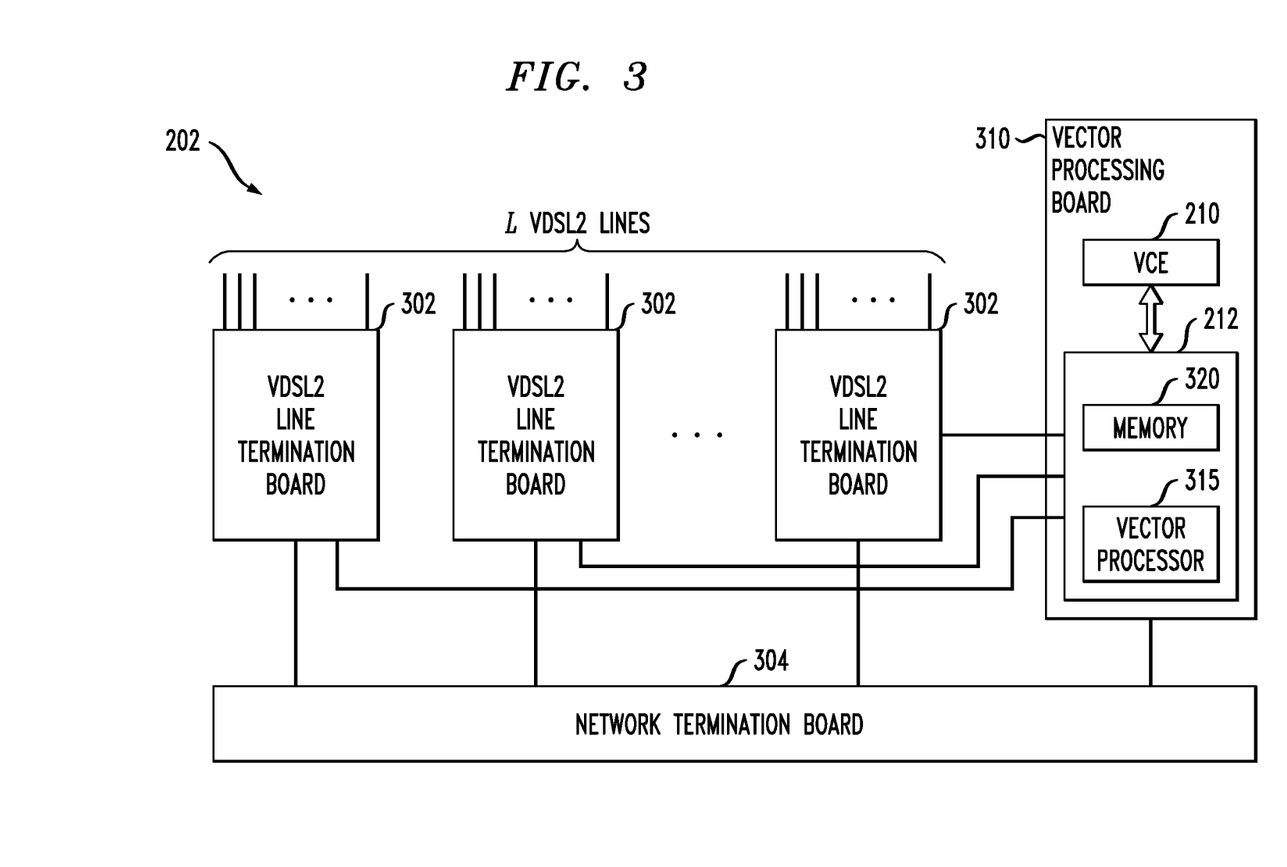
FIG. 3 shows a more detailed view of one possible implementation of a portion of a DSL access multiplexer of the FIG. 2 system.

FIG. 3 shows a more detailed view of one possible implementation of a portion of the DSLAM 202 of FIG. 2. In this exemplary implementation, the DSLAM 202 comprises a plurality of VDSL2 line termination boards 302 that are coupled to a network termination board 304 and to a vector processing board 310. The vector processing board 310 includes the VCE 210 and the vectoring signal processing module 212, and may also include additional vectoring circuitry not explicitly shown but commonly included in a conventional implementation of such a vector processing board. The vectoring signal processing module 212 includes vector processor 315 and its associated external memory 320. The operation of the vector processor 315 will be described in greater detail below in conjunction with FIG. 5.

The vectoring signal processing unit 212 in DSLAM 202 is configured under control of the VCE 210 to implement pre-compensation for signals transmitted in the downstream direction and post-compensation for signals received in the upstream direction. Effective implementation of these and other crosstalk control techniques requires performance of operations such as computing matrix-vector products. However, as indicated previously, conventional techniques for performing such operations can consume excessive amounts of processor and memory resources, thereby limiting the number of lines that can be within a given vectoring group. Illustrative embodiments of the present invention overcome this problem by providing techniques for efficient generation of pre-compensated and post-compensated signals using a compressed sparse row (CSR) representation of precoder and postcoder matrices in precoder 214 and postcoder 216, respectively.

Figure 4:
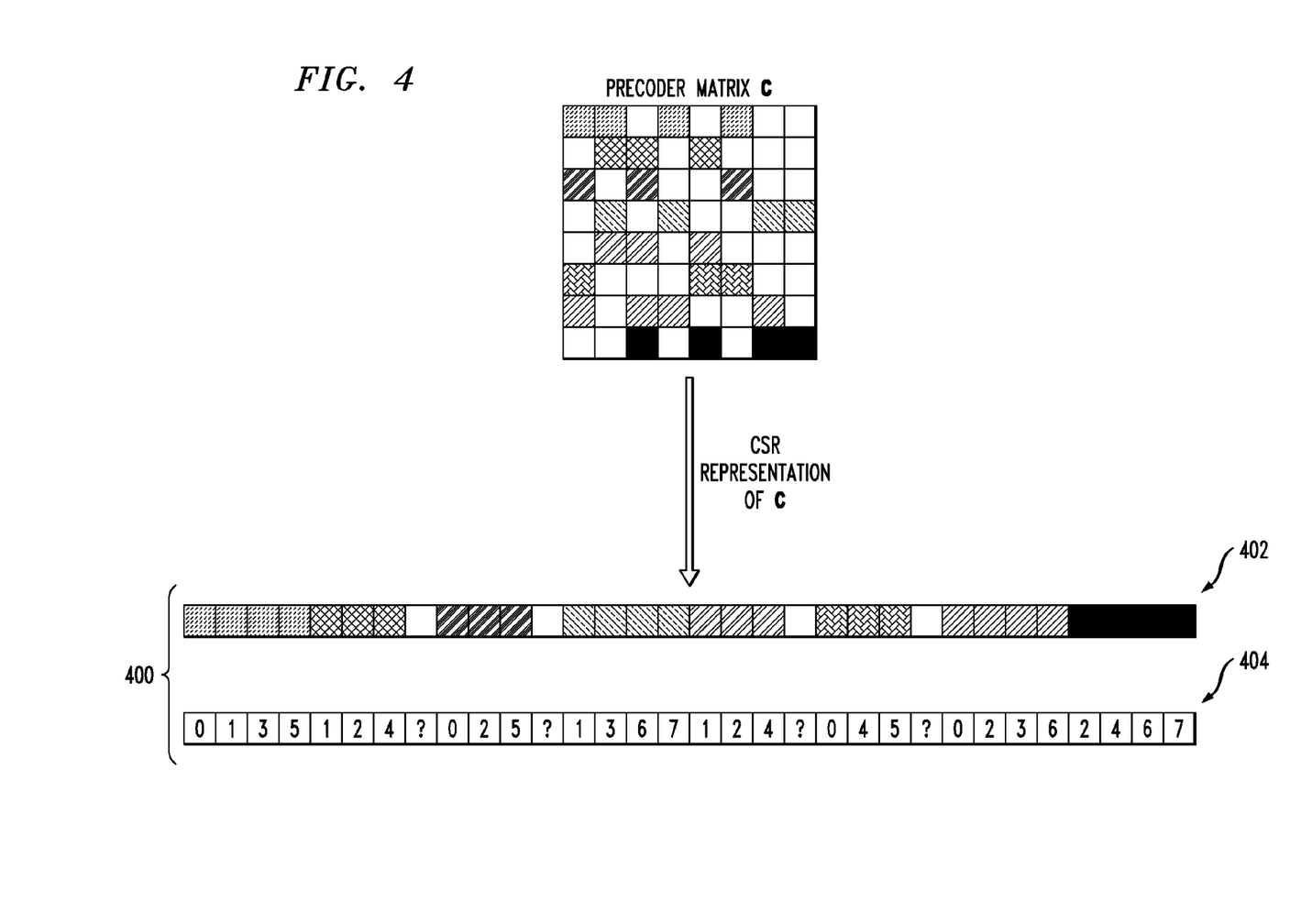
FIG. 4 is a diagram illustrating the relationship between a precoder matrix and an exemplary compressed sparse row (CSR) representation of the precoder matrix utilized in a vector processor of the DSL access multiplexer of FIG. 3.

FIG. 4 shows an example of the CSR representation of a precoder matrix C in an illustrative embodiment. The precoder matrix C in this particular example is an N×N matrix in which N=8. Thus, there are N lines in the vectoring group, where N is assumed to be less than or equal to the total number of lines L supported by the system. In this diagram, entries in the precoder matrix C that have substantially non-zero values are shown as shaded blocks, while entries that have values equal to zero or close to zero are shown as unshaded blocks. It can be seen that the number of non-zero values in each row of the precoder matrix C is no more than m, where m<<N and in this example m=4. A given one of the values C [i,j] generally indicates the level of crosstalk into line i from line j.

In many DSL systems, the number of dominant disturber lines causing crosstalk into a given victim line, generally denoted by in in this example, is typically much less than N. This is often due at least in part to lines being in different binders, as intra-binder crosstalk between lines in the same binder is usually significantly higher than inter-binder crosstalk between lines in different binders. However, even for lines that are within the same binder, the number of dominant disturbers can still be very low. For example, a large binder having more than 100 lines may have a number of dominant disturbers that is on the order of about 6-12. As a result, the precoder matrix C is usually sparse, and m can be made much less than N, as indicated previously.

Typically, the precoder matrix C is computed by VCE 210 and its corresponding CSR representation 400 is generated as illustrated in FIG. 4. In this example, where N=8 and m=4, the sparse representation 400 includes a value array 402 and an index array 404, each comprising N·m=32 entries. The value array 402 comprises four values from each of the eight rows of the precoder matrix C, for a total of 32 values. Thus, the value array 402 in the present embodiment is generated by specifying a maximum number m of dominant disturbers, and generating a single row of length N·m comprising in values from each of the N rows of the original N×N precoder matrix C. The values are crosstalk coefficients, which are usually complex values. The corresponding index array 404 identifies by scalar numerical index the particular entries from each of the N rows of the precoder matrix C that are included in the m values for that row in the value array 402. It can be seen that some of the rows of the precoder matrix C, such as the second and third rows, include fewer than m=4 shaded blocks, but the value array 402 still includes m values for each row. This is by way of example only, and other techniques may be used to generate a compressed representation. Such techniques may involve, again by way of example, specifying different maximum numbers of dominant disturbers for different rows of the precoder matrix.

Although shown as single-row linear arrays in this example, the value and index array portions 402 and 404 of the CSR 400 may alternatively be arranged in the form of respective N×m matrices, or in other formats. The term "compressed representation" therefore is intended to be construed broadly, as a representation that includes substantially fewer entries than would typically be found in a conventional precoder or postcoder matrix. Also, the term "array" is intended to encompass linear arrangements of entries, as well as matrices or other arrangements of multiple entries.

Figure 5:
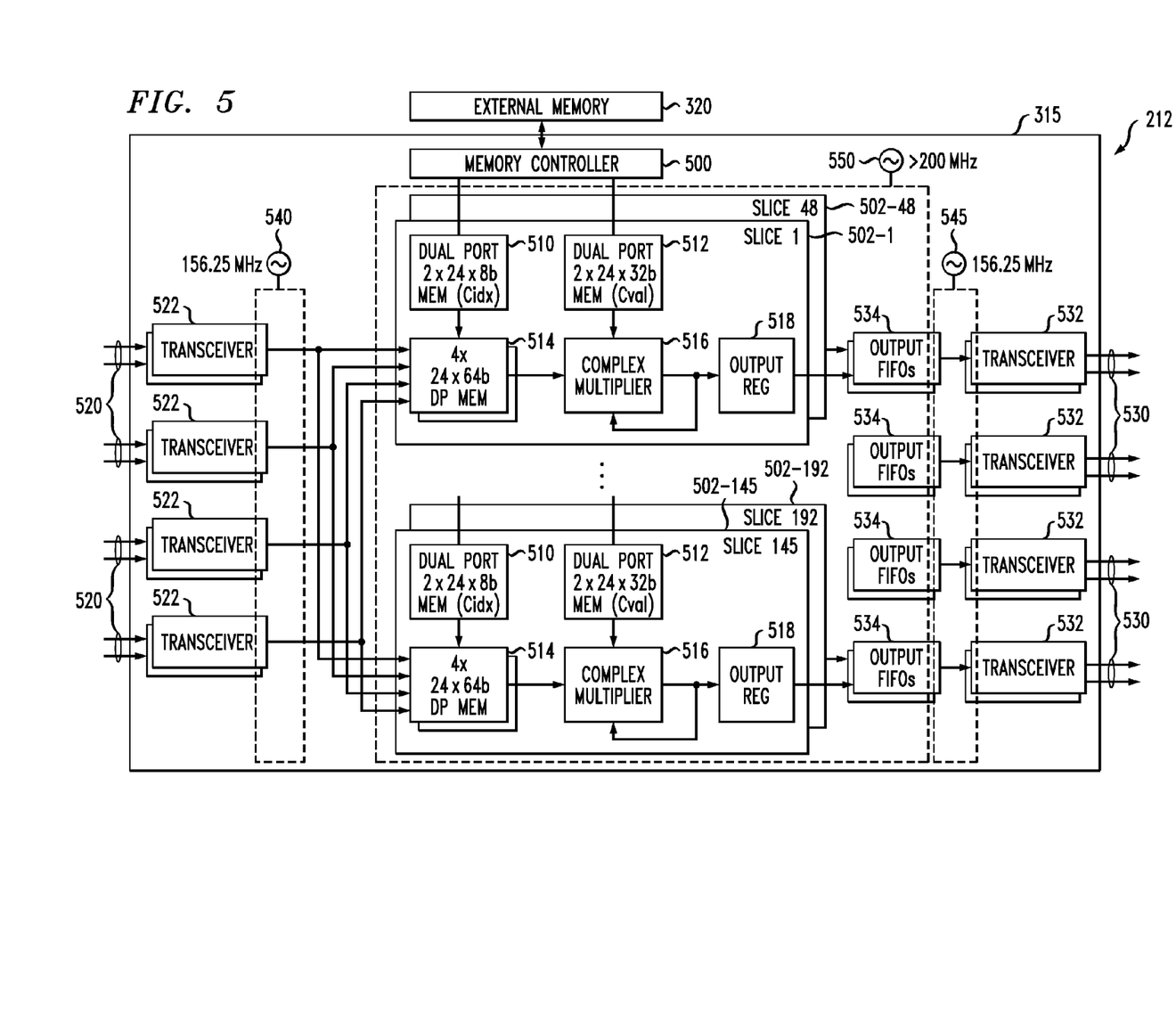
FIG. 5 shows a more detailed view of one possible implementation of a vector processor and associated external memory of the vectoring signal processing module of the DSL access multiplexer of FIG. 3.

The CSR representation 400 allows the implementation of a particularly efficient vector processor 315. The vector processor 315 in an illustrative embodiment significantly reduces the amount of processor and memory resources required to perform operations such as computation of matrix-vector products. The basic precoding computation performed in the vector processor 315 using the CSR representation 400 is as follows:

for $i=0$ to $N-1$ do for $k=i\cdot m$ to $(i+1)\cdot(m-1)$ do

$y[i]=y[i]+C\text{value}[k]\cdot x[C\text{index}[k]]$ In this basic precoding computation, y is an N×1 vector of pre-compensated signals, x is the corresponding N×1 vector of signals prior to pre-compensation, Cvalue[k] denotes entry k in the value array 402, and Cindex[k] denotes entry k in the index array 404. A particular advantage of this arrangement is that all of the N outputs y[i] can be computed in parallel. With appropriate configuration of the vector processor 315, a given matrix-vector product y=Cx can be computed in m cycles, compared to N cycles for a conventional direct computation approach, and thus processing time is reduced by a factor of N/m. Also, the memory requirement is substantially reduced, from N×N×(re+im) bits required to store the precoder matrix C, to N×m×(re+im+$\log_2$ N) bits required to store the corresponding CSR representation, where re and im denote the number of bits in the respective real and imaginary parts of a given crosstalk coefficient in the value array 402, and assuming that $\log_2 N$ bits are used for each scalar entry of the index array 404.

FIG. 5 shows the vector processor 315 and external memory 320 of vectoring signal processing module 212, as configured to implement the above-described pre-compensation operations for a case of N=192. The vector processor 315 comprises a memory controller 500 coupled between the external memory 320 and each of 192 separate computation slices denoted 502-1, . . . 502-48, . . . 502-145, . . . 502-192.

Each computation slice 502 comprises a 2×24×8 bit dual-port memory 510 for storing entries of the Cindex array, a 2×24×32 bit dual-port memory 512 for storing entries of the Cvalue array, four 24×64 bit dual-port memories 514 for storing entries of the vector x, an 18×18 complex multiply-accumulate unit 516, and a 32 bit output register 518. The dual-port memories 514 have a selection input coupled to an output of the index array memory 510. The complex multiply-accumulate unit 516 has inputs coupled to outputs of the value memory 512 and the dual-port memories 514. The output register 518 has an input coupled to an output of the complex multiply-accumulate unit 516. Also, that output is fed back to an accumulate input of the unit 516.

The input signals of vector x are supplied to the vector processor 315 via input signal lines 520 coupled to transceivers 522. The pre-compensated output signals of vector y are supplied to output signal lines 530 from the computation slices 502 via transceivers 532 and output FIFO buffers 534.

For this embodiment, where N=192 and further assuming that m=24, re=8 and im=8, the required memory for storing the value and index arrays of the CSR is N×m×(re+im+$\log_2$ N)=192×24×(8+8+$\log_2$192)≈110 kbits per tone. Multiplying this by 4096 tones gives a full memory requirement of about 7 Mbytes. The required computation time per tone is given approximately by m/F, where F denotes the operating speed of the complex multiplier 516. Assuming that F=400 MHz, the computation time per tone is about 60 nanoseconds. Thus, the vector processor 315 exhibits substantially lower processor and memory requirements, and substantially reduced computation time, relative to conventional direct computation approaches. Although N=192 in this embodiment, higher or lower values of N may be used in other embodiments.

As indicated previously, the CSR representation of the precoder matrix C is generated by the VCE 210, and supplied from the VCE to the vector processor 315. More specifically, the CSR representation of the precoder matrix is stored in the external memory 320 which is updated and maintained by the VCE 210. Portions of the CSR representation are read into the memories 510 and 512 during vectoring computations. Since the VCE determines the precoder matrix C in non-realtime, the VCE will have sufficient time to convert the precoder matrix C into the desired CSR representation for use by the vector processor. Typically, the time required to gather sufficient error samples to perform a given precoder matrix update is on the order of about 16 seconds if N=192.

The various elements of the vector processor 315 can be implemented in a straightforward manner using a single FPGA, such as, for example, an Altera Stratix IV GX or GT FPGA, as would be appreciated by one skilled in the art. Other arrangements of one or more integrated circuits or other types of vectoring circuitry may be used to implement a vector processor in accordance with an embodiment of the present invention.

It is to be understood that the vector processor 315 may also or alternatively be used to perform operations associated with post-compensation.

The illustrative embodiments advantageously provide a substantial reduction in the processor and memory resources required for performing pre-compensation and post-compensation operations in vectored DSL systems, thereby permitting use of much larger groups of vectored lines than would otherwise be possible. Also, the required computation time per tone is significantly reduced. DSL systems implementing the disclosed techniques exhibit reduced cost, lower power consumption, and enhanced throughput performance relative to conventional arrangements.

Embodiments of the present invention may be implemented at least in part in the form of one or more software programs that are stored in a memory or other processor-readable medium of AN 102 of system 100. Such programs may be retrieved and executed by a processor in the AN. The processor 115 may be viewed as an example of such a processor. Of course, numerous alternative arrangements of hardware, software or firmware in any combination may be utilized in implementing these and other systems elements in accordance with the invention. For example, embodiments of the present invention may be implemented in a DSL chip or other similar integrated circuit device. Thus, elements such as transceivers 208, VCE 210 and vectoring signal processing module 212 may be collectively implemented on a single integrated circuit, or using multiple integrated circuits. As another example, illustrative embodiments of the invention may be implemented using multiple line cards of a DSLAM or other access node. Examples of access nodes having multiple line card arrangements that can be adapted for use in implementing embodiments of the present invention are disclosed in European Patent Application No. 09290482.0, filed Jun. 24, 2009 and entitled "Joint Signal Processing Across a Plurality of Line Termination Cards." The term "vectoring circuitry" as used herein is intended to be broadly construed so as to encompass integrated circuits, line cards or other types of circuitry utilized in implementing operations associated with crosstalk cancellation in a communication system.

It should again be emphasized that the embodiments described above are presented by way of illustrative example only. Other embodiments may use different communication system configurations, AN and NT configurations, communication channels, or compensation operations, depending on the needs of the particular communication application. Also, a variety of different formats may be used for the compressed representation of a given precoder or postcoder matrix. Alternative embodiments may therefore utilize the techniques described herein in other contexts in which it is desirable to provide improved crosstalk control between multiple channels of a communication system.

It should also be understood that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method of controlling crosstalk between channels of a communication system, comprising:
   estimating crosstalk between channels of the system;
   generating a compressed representation of the crosstalk estimates; and
   generating compensated signals based on the compressed representation of the crosstalk estimates;
   wherein the compressed representation comprises a value array and an index array, the value array comprising selected values from each of a plurality of rows of a matrix representation of the crosstalk estimates and the index array identifying locations of the selected values in the matrix representation of the crosstalk estimates.

2. The method of claim 1 wherein the step of generating compensated signals based on the compressed representation of the crosstalk estimates comprises generating pre-compensated signals.

3. The method of claim 2 further comprising the step of transmitting the pre-compensated signals from an access node of system to respective network terminals of the system over respective ones of the channels.

4. The method of claim 1 wherein the step of generating compensated signals based on the compressed representation of the crosstalk estimates comprises generating post-compensated signals.

5. The method of claim 4 further comprising the step of receiving uncompensated signals in an access node of the system from respective network terminals of the system over respective ones of the channels, wherein the post-compensated signals are generated from respective ones of the received uncompensated signals.

6. The method of claim 1 wherein the matrix representation of the crosstalk estimates is in the form of an N×N precoder or postcoder matrix, where N denotes the number of channels, and further wherein the N×N precoder or postcoder matrix is converted by a vector control entity into the compressed representation comprising the value array and the index array, each of which has N·m entries, where m is less than N and denotes a specified maximum number of dominant disturber channels for a given victim channel.

7. The method of claim 6 wherein the entries of the value array comprise complex values corresponding to respective ones of m selected crosstalk estimates from each of N rows of the precoder or postcoder matrix.

8. The method of claim 6 wherein the entries of the index array comprise scalar values denoting indices of respective ones of m selected crosstalk estimates from each of N rows of the precoder or postcoder matrix.

9. The method of claim 6 wherein at least one of the value array and the index array is in the form of a single row of length N·m.

10. The method of claim 6 wherein at least one of the value array and the index array is in the form of a matrix of dimension N×m.

11. The method of claim 2 wherein the step of generating pre-compensated signals further comprises performing the following operations:

for $i=0$ to $N-1$ do for $k=i \cdot m$ to $(i+1) \cdot (m-1)$ do $$y[i]=y[i]+Cvalue[k] \cdot x[Cindex[k]]$$

where N denotes the number of channels, m is less than N and denotes a specified maximum number of dominant disturber channels for a given victim channel, y is an N×1 vector of pre-compensated signals, x is a corresponding N×1 vector of signals prior to pre-compensation, Cvalue[k] denotes entry k in the value array of the compressed representation, and Cindex[k] denotes entry k in the index array of the compressed representation.

12. A non-transitory computer-readable storage medium having embodied therein executable program code that when executed by a processor of an access node of the system causes the access node to perform the steps of the method of claim 1.

13. An apparatus comprising:
an access node configured to control crosstalk between channels of communication system;
wherein the access node comprises:
a plurality of transceivers; and
vectoring circuitry coupled to the transceivers;
the vectoring circuitry comprising a processor coupled to a memory and being operative to estimate crosstalk between the channels of the system, to generate a compressed representation of the crosstalk estimates, and to generate compensated signals based on the compressed representation of the crosstalk estimates;
wherein the compressed representation comprises a value array and an index array, the value array comprising selected values from each of a plurality of rows of a matrix representation of the crosstalk estimates and the index array identifying locations of the selected values in the matrix representation of the crosstalk estimates.

14. The apparatus of claim 13 wherein the access node comprises a DSL access multiplexer.

15. The apparatus of claim 13 wherein the vectoring circuitry comprises:
a vector control entity operative to estimate the crosstalk between the channels of the system and to generate the compressed representation of the crosstalk estimates; and
a vectoring signal processing module operative to generate the compensated signals based on the compressed representation of the crosstalk estimates.

16. The apparatus of claim 13 wherein the processor comprises a vector processor configured to generate the compensated signals.

17. The apparatus of claim 16 wherein the vector processor comprises:
a plurality of computation slices arranged in parallel with one another, one for each of the channels;
wherein each of the computation slices comprises:
first memory circuitry for storing entries of the index array;
second memory circuitry for storing entries of the value array;
third memory circuitry for storing entries of an uncompensated input signal vector and having a selection input coupled to an output of the first memory circuitry;
a complex multiply-accumulate unit having inputs coupled to outputs of the first and third memory circuitry; and
an output register having an input coupled to an output of the complex multiply-accumulate unit;
the computation slice generating entries of a compensated output signal vector.

18. The apparatus of claim 17 wherein the compressed representation is stored in an external memory of the vector processor under control of a vector control entity and portions of said representation are supplied to the first and second memory circuitry of the vector processor as needed for vectoring computations performed by the vector processor.

19. The apparatus of claim 17 wherein the vector processor is implemented in the form of a single integrated circuit.

20. A communication system comprising the apparatus of claim 13.

21. An integrated circuit comprising:
a vector processor operative to generate compensated signals based on a compressed representation of estimates of crosstalk between channels of a communication system;
wherein the compressed representation comprises a value array and an index array, the value array comprising selected values from each of a plurality of rows of a matrix representation of the crosstalk estimates and the index array identifying locations of the selected values in the matrix representation of the crosstalk;
wherein the vector processor comprises:
a plurality of computation slices arranged in parallel with one another, one for each of the channels;
wherein each of the computation slices comprises:
first memory circuitry for storing entries of the index array;
second memory circuitry for storing entries of the value array;
third memory circuitry for storing entries of an uncompensated input signal vector and having a selection input coupled to an output of the first memory circuitry;
a complex multiply-accumulate unit having inputs coupled to outputs of the first and third memory circuitry; and
an output register having an input coupled to an output of the complex multiply-accumulate unit;
the computation slice generating entries of a compensated output signal vector.

* * * * *